Patented Nov. 27, 1951

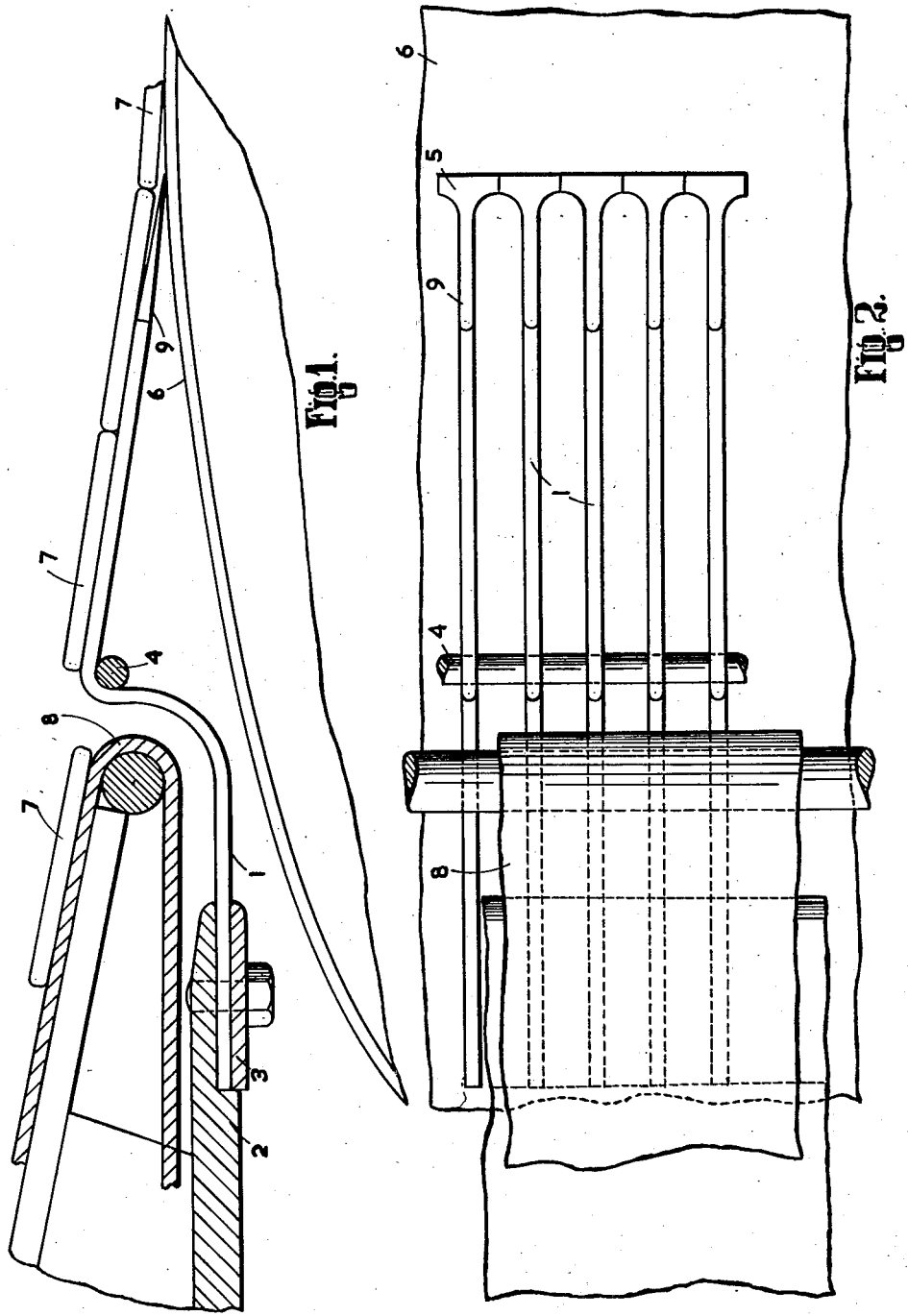

2,576,633

UNITED STATES PATENT OFFICE 2,576,633

STRIPPING DEVICE FOR CONVEYERS

Joseph Francis Naylor, Newton-le-Willows, England, assignor to T. & T. Vicars Limited, Earlestown, Newton-le-Willows, England, a British company Application May 10, 1948, Serial No. 26,177
In Great Britain December 3, 1947

2 Claims. (Cl. 198—188)

The present invention relates to improved conveying arrangements for biscuits and the like articles.

The difficulties of stripping baked articles from an endless band, conveyor or drum so that the articles and residue are effectively separated one from another, whereby the articles only are passed to the following element and the residue removed both from amid the articles and from the endless band, conveyor or drum, are well known to those experienced in the art. In one known method spring steel fingers of small diameter, having the outer end of each sharpened to a point, are employed. These fingers are anchored at their inner ends, and are positioned in close proximity one to another, thereby allowing any residue on the band to pass to a further point at which it is scraped or otherwise removed therefrom. The pointed fingers make it necessary that the articles being stripped are comparatively hard when they reach the point of removal. Articles which are soft when stripped from the band are liable to be damaged if stripped therefrom by pointed fingers as above described, and in another known method a series of thin steel plates positioned to form an almost continuous surface across the surface of the band are employed. In this latter method it will be appreciated that any residue is also stripped off the band and may be delivered to the following element.

An object of the present invention is to provide a device for stripping articles from an endless band, conveyor or drum, whereby both hard and soft articles may be stripped from said band without becoming damaged thereby, and whereby any residue which may be scraped from said band by said stripping device is prevented from being delivered to the following element.

The invention is further described with reference to the accompanying diagrammatic drawings, in which:

Fig. 1 is a side elevation showing the fingers in one form of construction,

Fig. 2 is a corresponding partial plan view.

The stripping device comprises a plurality of independent fingers each formed of a spring bar 1 clamped in a holder 2 by means of a clamping plate 3, each spring bar 1 being cranked over or around a cross bar 4 and extending downwardly so that their free ends 5 are held elastically in contact with the surface of a steel conveying band 6, cylinder or the like surface supporting flat articles such as biscuits 7 which consequently ride up the fingers and can be thereby transferred to a moving conveyor 8.

Each spring bar has its outer end widened or flattened, as shown, to a width substantially equivalent to the spacing between the individual fingers, these ends 5 being preferably of T-shape, so that they have a total lateral width at their wider end substantially equal to the total spacing of the fingers.

The spring fingers 1 are also preferably sharpened or tapered at their wider or flattened end, as shown at 9.

The cross bar 4 may, if desired, be attached to individual fingers 1 by welding.

It will consequently be seen that biscuits or the like articles travelling on the endless band, conveyor or drum will be stripped therefrom by the said fingers and will slide along them, usually at a slight downward angle to the horizontal, so that they can fall from these fingers, slightly beyond the place where the fingers are affixed to the cross bar, upon a transverse chute, or alternatively upon the upper flight of a second receiving web conveyor belt. It will also be seen that any loose residue which may be stripped from the band, conveyor or drum will slide along said fingers and will fall from them through one or more of the gaps formed between the fingers; the residue may then be collected into a suitable receptacle. The arrangement of the present invention is particularly suitable for the stripping of soft or plastic articles conveyed upon an endless conveying belt or band.

I declare that what I claim is:

1. A stripping device for removing laminar articles from a moving surface comprising a plurality of spaced spring fingers, a cross bar over which said spring fingers are cranked and welded thereto, and expanded sharpened ends to said spring fingers occupying substantially a width similar to the spacing of the fingers and adapted to engage the moving surface.

2. A stripping device for removing laminar articles from a moving surface comprising a plurality of spaced spring fingers, expanded sharpened ends to said spring fingers occupying substantially a width similar to the spacing of the fingers and adapted to engage the moving surface, a cross bar over which said spring fingers are cranked and fixedly connected thereto, and a transverse holder clamping the ends of the spring fingers remote from said expanded sharpened ends and urging the blades into contact with said moving surface.

JOSEPH FRANCIS NAYLOR.

REFERENCES CITED

The following references are of record in the file of this patent:

UNITED STATES PATENTS

| Number | Name | Date |
| --- | --- | --- |
| 743,955 | Thompson | Nov. 10, 1903 |
| 846,536 | Walsh | Mar. 12, 1907 |
| 1,044,450 | Gammeter | Nov. 12, 1912 |
| 1,196,090 | Doyle | Aug. 29, 1916 |
| 1,720,609 | Rondolin | July 9, 1929 |
| 2,117,958 | Hershey | May 17, 1938 |
| 2,329,277 | Lodding | Sept. 14, 1943 |